United States Patent [19]
Jackson et al.

[11] Patent Number: 5,585,702
[45] Date of Patent: Dec. 17, 1996

[54] AUTO UP WINDOW WITH OSBTACLE DETECTION SYSTEM

[75] Inventors: James A. Jackson, Dayton; Roy A. McCann, Kettering, both of Ohio

[73] Assignee: ITT Automotive Electrical Systems, Inc., Auburn Hills, Mich.

[21] Appl. No.: 552,669

[22] Filed: Nov. 3, 1995

[51] Int. Cl.⁶ ............................................ E05F 15/16
[52] U.S. Cl. ................ 318/266; 318/286; 318/468; 318/471
[58] Field of Search .......................... 318/264, 265, 318/266, 286, 466, 467, 468, 469, 471; 388/903, 907.5, 934; 307/10.1; 49/26, 28

[56] References Cited

U.S. PATENT DOCUMENTS

| | | |
|---|---|---|
| 2,875,464 | 3/1959 | Collins . |
| 4,585,981 | 4/1986 | Zintler . |
| 4,662,575 | 5/1987 | Juzswik et al. . |
| 4,683,975 | 8/1987 | Booth et al. . |
| 4,709,196 | 11/1987 | Mizuta . |
| 4,931,714 | 6/1990 | Yamamoto . |
| 4,942,349 | 7/1990 | Millerd et al. . |
| 4,952,854 | 8/1990 | Periou et al. ............... 318/257 |
| 4,970,446 | 11/1990 | Yaguchi . |
| 4,980,618 | 12/1990 | Milnes et al. . |
| 4,994,724 | 2/1991 | Hsu . |
| 5,039,925 | 8/1991 | Schap . |
| 5,105,131 | 4/1992 | Schap . |
| 5,278,480 | 1/1994 | Murray . |
| 5,334,876 | 8/1994 | Washeleski et al. ............ 307/10.1 |
| 5,422,551 | 6/1995 | Takeda et al. ............ 318/265 |
| 5,483,135 | 1/1996 | Parks ............ 318/469 |
| 5,488,276 | 1/1996 | Nishibe ............ 318/473 |

*Primary Examiner*—Bentsu Ro
*Attorney, Agent, or Firm*—Thomas N. Twomey; J. Gordon Lewis

[57] ABSTRACT

A closure system for a motor vehicle includes a closure, a closure frame, an electric motor, a control switch, an electrical power source, first and second displacement sensors, a temperature sensor, a current sensor for a current being drawn by the electric motor, and a microprocessor. The first and second displacement sensors each operably generate a signal indicative of closure movement. The microprocessor is electrically connected to the control switch, the electric motor, the first and second displacement sensors, the temperature sensor and the current sensor. The microprocessor electrically connects the motor with the power source responsive to a condition of the control switch. The microprocessor also converts the temperature sensed to an electrical signal indicative of the temperature, and converts the current sensed to an electrical signal indicative of motor current. The microprocessor uses the signals for current and temperature to calculate a temperature compensated drag force of the closure at a number of predetermined closure positions. The microprocessor determines the closure position by using signals from the displacement sensors. The microprocessor compares the temperature compensated drag force with a reference drag force and reverses the motor when the compensated drag force is greater than the reference drag force.

9 Claims, 3 Drawing Sheets

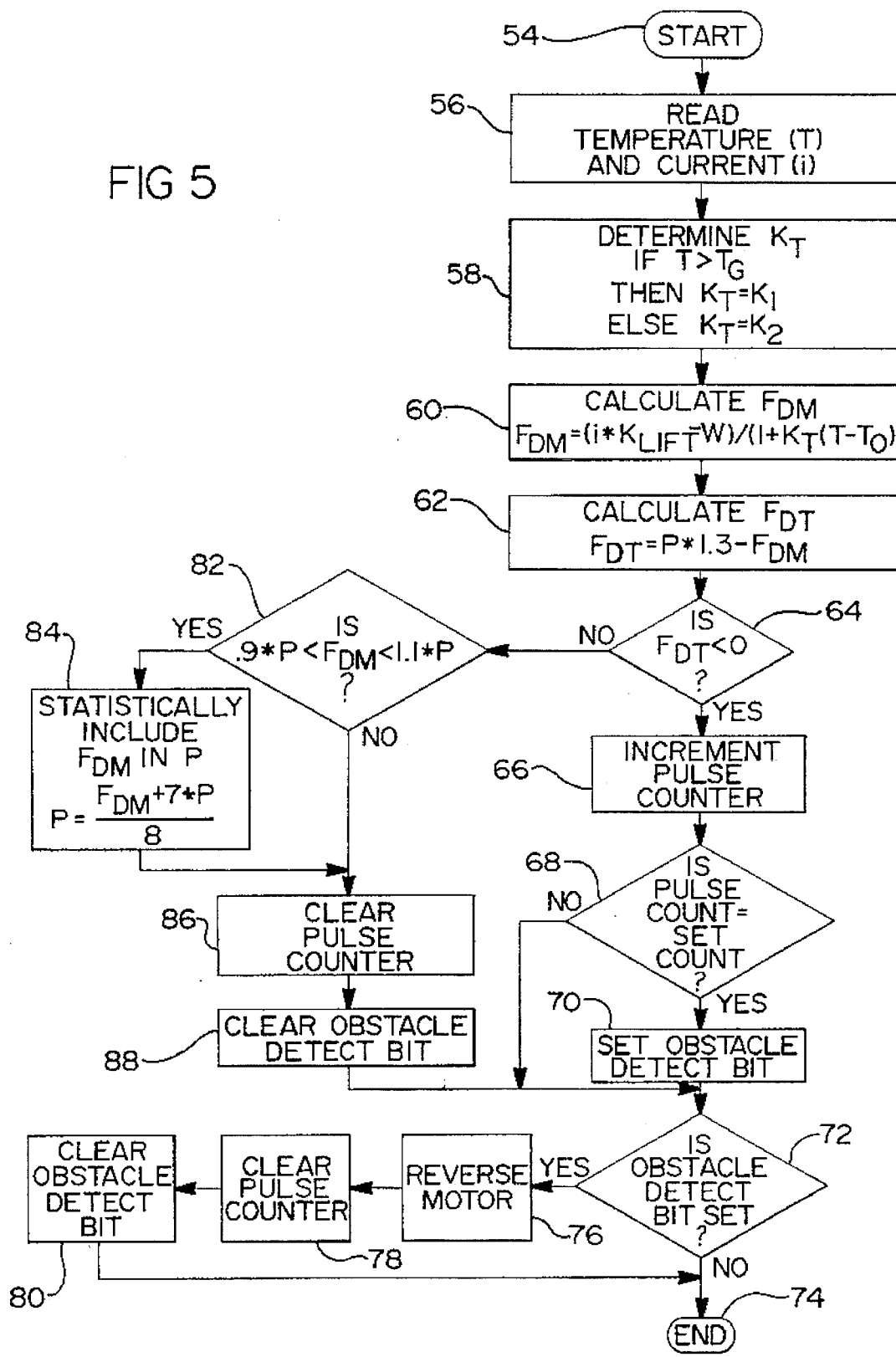

ns5,585,702

AUTO UP WINDOW WITH OSBTACLE DETECTION SYSTEM

BACKGROUND OF THE INVENTION

The present invention relates to a power drive system for motor vehicle closures such as windows. It is particularly directed to an automatic reverse feature for power driven closures which, in normal operation, continue closing motion automatically after a user switch has been released.

Some motor vehicles are available with a power window system having an auto-up mode of operation. In these systems, a window will continue to move up even after the user switch has been released. A government mandated motor vehicle standard requires that a window operating in the auto-up mode must reverse direction before it exerts a 100 N force on a 10 N per mm compliant cylindrical rod between the window and window frame.

It is desired to provide a highly reliable auto reverse feature for use with windows having an auto-up mode of operation requiring a minimum of computing power, enabling the use of an inexpensive microprocessor to reliably control window movement.

SUMMARY OF THE INVENTION

In accordance with the present invention, a closure system for a motor vehicle includes a closure, a closure frame, an electric motor, a control switch, an electrical power source, first and second displacement sensors, means for sensing a temperature, means for sensing a current being drawn by the motor and a microprocessor. The electric motor has an output shaft. The closure frame defines a seated position of the closure. The electrical power source includes a battery. The first and second displacement sensors each operably generate a signal indicative of the one of closure movement and output shaft rotation. The microprocessor is electrically connected to the control switch, the electric motor, the first and second displacement sensors, the means for sensing a temperature and the means for sensing a current. The microprocessor includes means for electrically connecting the motor with the power source responsive to a condition of the control switch. The microprocessor also has means for converting temperature sensed to an electrical signal indicative of the temperature. The microprocessor also includes means for converting current sensed to an electrical signal of motor current, and means for calculating a drag force of the closure at predetermined positions as indicated by signals from the displacement sensors as the closure is moved from an open position to the seated position. The microprocessor further includes means for calculating a compensated drag force using the drag force and a temperature correction factor. The microprocessor yet further includes means for comparing the drag force with a reference drag force and electing to reverse the motor when the compensated drag force is less than the reference drag force.

Other advantages and features of the invention will become apparent by reference to the following specification and to the drawings.

BRIEF DESCRIPTION OF THE DRAWINGS

FIG. 5 is a block diagram flow chart showing the logic used to determine whether an obstacle has been impinged against by the closure.

DETAILED DESCRIPTION OF THE PREFERRED EMBODIMENT

Figure 1:
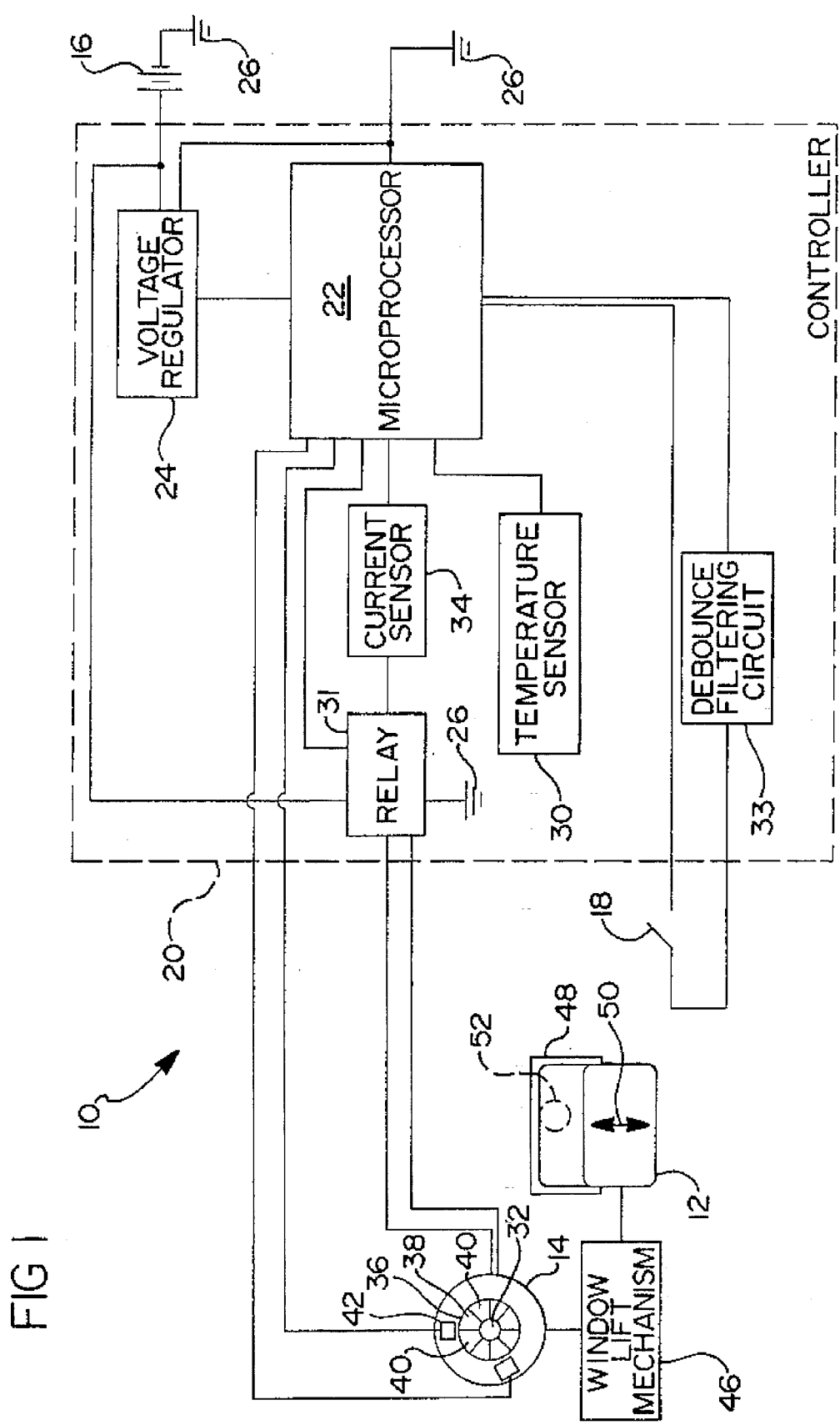
FIG. 1 is a schematic representation of an auto-up window with the obstacle detection system of the present invention.

A window lift system 10 is shown in schematic form in FIG. 1. The exemplary closure, a window 12, is selectively driven by a fractional horsepower electric motor 14 selectively energized by a conventional 12 volt battery 16. An operator controlled input switch 18 is electrically connected to a controller 20 disposed between battery 16 and motor 14. Controller 20 has a microprocessor 22, the preferred type being an eight bit Motorola microprocessor number MC68HC05P9. Input switch 18 is connected to microprocessor 22.

A voltage regulator 24 is disposed between battery 16 and microprocessor 22. The exemplary voltage regulator 24 is an LM2931 from National Semiconductor and regulates the anticipated nine to sixteen volt potential of battery 16 down to five volts required to drive microprocessor 22. Regulator 24, battery 16 and microprocessor 22 are connected to a common electrical ground 26.

A temperature sensor 30, the preferred type of which is a negative temperature coefficient resistor, is electrically connected with microprocessor 22 and disposed within controller 20. The benefit of placing temperature sensor 30 within controller 20 is the minimization of external connections and improved packaging, however, sensor 30 could alternatively be located outside controller 20. Additionally, other types of temperature sensors could be used in place of the negative temperature coefficient resistor, such as a bimetalic thermocouple, or a thermocouple and amplifier combination.

A relay 31, number V2R1001 from Potter and Brumfield, is disposed between battery 16 and motor 14 and is also electrically connected to microprocessor 22. Relay 31 electrically connects motor 14 with battery 16 responsive to control signals from controller 22. Relay 31 is used to selectively energize motor 14 to rotate motor shaft 32 in either direction.

Typically, relay 31 closes responsive to closure of input switch 18. However, to avoid an intermittent stop-start condition with the closure of switch 18, a debounce filtering circuit 33 is disposed between switch 18 and controller 20. The details of circuit 33 are not disclosed herein, as they are well known in the art.

Current sensor 34, an exemplary one being number LM2904 from National Semiconductor, is disposed between relay 31 and an A/D converter input port of microprocessor 22. Current sensor 34 converts a current signal from relay 31, scaling the anticipated battery current output range to a proportionate zero to five volt signal suited for use by microprocessor 22.

Motor shaft 32 of electric drive motor 14 has a magnetic ring 36 mounted thereon with eight magnetic poles, alternating north 38 and south 40. First and second hall effect sensors 42 and 44 respectively, an exemplary type being number A3187EUA from the Allegro Company, are mounted proximate to magnetic ring 36. One hall effect sensor would be sufficient to monitor motor shaft rotation. However, two sensors 42 and 44 are needed to determine the direction of motor shaft rotation.

A window lift mechanism 46 functionally connects motor 14 with window 12, translating rotary motion of motor 14 into movement of window 12 within window frame 48 in the axial direction 50. Well known window lift mechanisms include cable drives, tape drives, and rack and pinion systems, among others. For most window lift mechanisms, vertical displacement of window 12 as a function of rotation of motor shaft 32 is a linear, or near- linear function. Thus, displacement of window 12 is easily correlated to the rotation of motor shaft 32, and the vertical velocity of window 12 correlated to the rotational velocity of motor shaft 32.

An obstacle 52 placed in the path of window 12 is engaged by window 12 with upward movement thereof.

Figure 2:
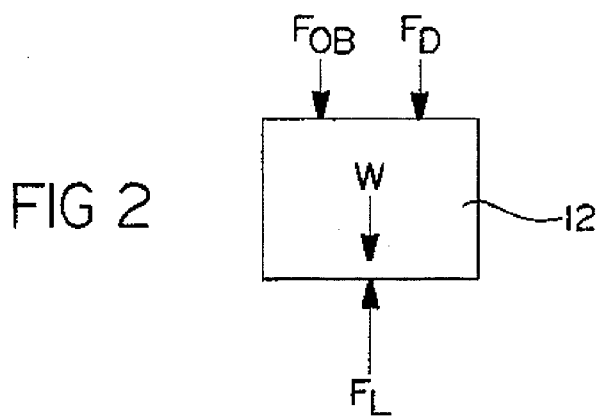
FIG. 2 is a schematic representation of the forces acting on a vertically sliding closure, such as a window.
Figure 3:
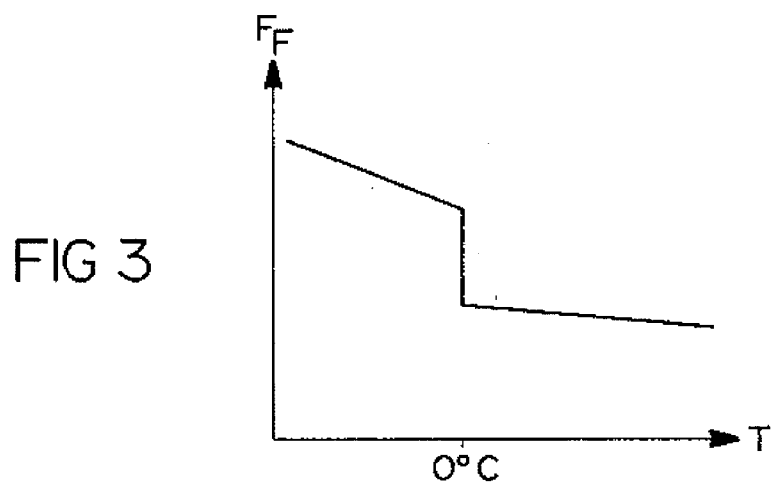
FIG. 3 is a plot of drag force as it varies with temperature.

FIG. 2 illustrates the force equilibrium of window 12 when moving at a steady state speed. Lifting force $F_L$ must overcome weight W of the window and drag or frictional forces $F_D$. $F_D$ is largely influenced by the stiffness of the closure seals (not shown) and the amount of contact between the seals and window 12 during window movement. When obstacle 52 is impinged against by window 12, $F_L$ must also overcome the resisting force of the obstacle, $F_{OB}$. Therefore, $F_L = W + F_D + F_{OB}$. $F_D$ is a temperature dependent variable which varies discontinuously in step-like fashion, as well as changing its slope, at a single transition temperature $T_G$ shown in FIG. 3. At temperatures above 0° C., $F_D$ has a first slope. At temperatures below 0° C., $F_D$ has a second slope appreciably steeper than the first slope of $F_D$.

The source of lifting force $F_L$ is electric motor 14. The torque available from motor 14 ($T_m$) is multiplied by a linkage factor ($K_L$) which may vary with window position (X). Similarly, motor shaft angular displacement (θ) or angular velocity (ω) can be converted to window position (X) or velocity (V) by dividing by $K_L$. Since lifting force $F_L$ is proportional to motor torque, and motor torque is proportional to current i, $F_L$ can be approximated by multiplying motor current i by a predetermined constant $K_{LIFT}$.

Drag force $F_D$ is difficult to estimate and to measure. However, given the force equilibrium of FIG. 2, $F_D = F_L - W - F_{OB}$. As long as there is no obstacle in the path of the window, $F_D = F_L - W$, or $F_D = i * K_{LIFT} - W$. By storing values of $F_D$ calculated with no obstacle present for a predetermined number of window positions, the presence of an obstacle can be detected at those window positions by comparing the stored values with subsequent calculations of $F_D$ for those same positions. A significant increase in $F_D$ results when current i increases, corresponding to an increase in motor torque and indicating that an obstacle has likely been engaged by window 12.

Given the above, a set of instructions in accord with FIG. 5 calculating a value of drag force $F_D$ and compensating it for temperature variations has been placed into microprocessor 22 to determine if an obstacle has been encountered by window 12.

The program of FIG. 5 uses a measured value of temperature (T) and current (i) and window position (X) to develop a compensated drag force value ($F_{DM}$). The compensated drag force value $F_{DM} = (i*K_{LIFT} - W)/(1 + K_T(T-T_o))$ for any position X in the window travel. $K_T$ is a temperature compensation factor which simulates the effect of the change in drag forces $F_D$ with temperature. $K_T$ is plotted in FIG. 4 and which corresponds to the slope of $F_D$ as a function of temperature. $T_o$ is an arbitrarily selected reference temperature. A reference temperature of 25° C. may be convenient if the initial velocity measurements are made at that temperature. $K_{LIFT}*i$ approximates the lifting force applied by the motor. W is the weight of the window.

Figure 4:
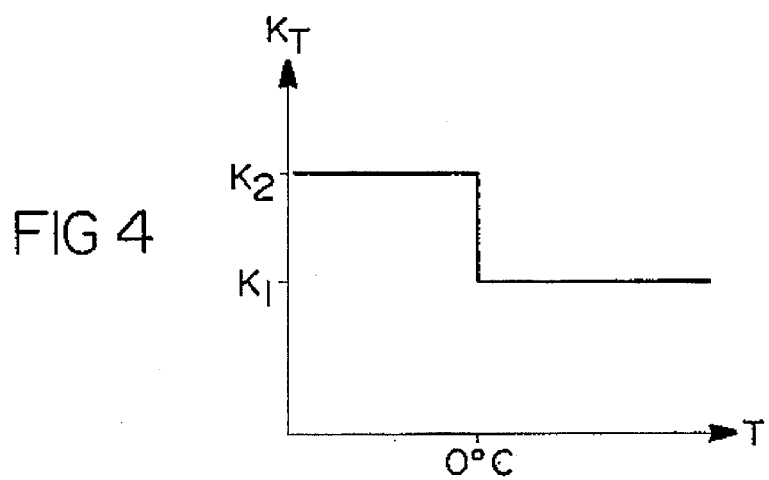
FIG. 4 is a plot of temperature compensation coefficient $K_T$ as a function of temperature.

FIG. 4 is a plot of temperature compensation coefficient $K_T$ as a function of temperature T. $K_T$, multiplied by a difference in temperature between the temperature at which the window is operating and a predetermined reference temperature of $T_o$, provides an estimate of the change in drag force $F_D$ that occurs with temperature changes. The quantity $(1+K_T(T-T_o))$ serves as a temperature correction factor.

A "crush zone" of window travel, approximated by the last one-third of upward window travel, is divided into 200 window positions, with the last position being the seated position of window 12. The number of positions can, of course, be varied to suit the specific application. Each window position corresponds to a corresponding number of rotations of motor shaft 32 as indicated to microprocessor 22 by hall effect sensors 42 and 44. A reference value for drag force (P), compensated for variations in temperature from $T_o$, is stored in microprocessor 22 for each of the 200 positions within the crush zone. By storing many reference values for compensated drag force throughout the range of window travel, localized variations in current i drawn by motor 14 attributable to the linkage configuration, and localized variations in seal drag, are automatically compensated for.

The 200 reference values of P for the window are initially set by operating window 12 through its range of travel and storing the values of $F_{DM}$ as P for each of the 200 positions of window 12 in the crush zone. In subsequent operations of window lift system 10, the value of FDM is averaged into P by multiplying P by 7 and adding FDM and dividing the total by 8 to get the new P.

The program is initiated at start block 54 every time an encoder transition is generated. An encoder transition is generated when a transition from north to south or south to north of magnet ring 36 occurs at one of hall sensors 42 and 44 at a rotative position corresponding to each one of the 200 window positions.

The program of FIG. 5 uses measured values of motor current (i) and temperature (T) and stored values of window weight (W), reference temperature ($T_o$), current-to-force factor ($K_{LIFT}$) and temperature compensation constant ($K_T$) to develop a compensated drag force value ($F_{DM} = (K_{LIFT}*i - W)/(1+K_T (T-T_o))$. It has been determined that comparing the compensated drag force $F_{DM}$ to a stored reference value P for that exact window position and determining if $F_{DM}$ is appreciably greater than P is a highly reliable and repeatable approach to determining whether an obstacle has been impinged upon by the window in its upward travel.

The program of FIG. 5, as noted, is executed every time an encoder transition is generated. Start block 54 represents the initiation of the program. In step 56, the temperature and current are read.

In step 58, constant $K_T$ which varies with temperature in accordance with FIG. 4, has its value determined. $K_T$ is used to approximate an increase in window linkage stiffness which occurs at approximately 0° C. At approximately this temperature and below, window seals become sufficiently stiff that there is an appreciable increase in resistance to window movement produced thereby. Therefore, $K_T$ has a first value $K_1$, above $T_G$, or 0° C., and a second higher value $K_2$ for temperatures below $T_G$.

Compensated drag force ($F_{DM}$) is calculated in step 60 according to the above-discussed equation in which $F_{DM} = (K_{LIFT}*i - W)/(1+K_T(T-T_o))$.

$F_{DM}$ is compared with P in step 62. To determine if an appreciable increase in $F_{DM}$ has occurred, indicative of the presence of an obstacle, $F_{DM}$ is compared with P which is multiplied by a first range factor to obtain a first drag force range value. In the exemplary embodiment, the first range factor is 1.3 and the resultant difference of $1.3 \times P - F_{DM} = F_{DT}$, the threshold reference value for drag force. The first range factor of 1.3 was selected for the system evaluated because lower values result in too many false obstacle detection reversals and higher values result in closure forces higher than desired. However, it is anticipated that other systems might be better suited to using a first range factor other than 1.3.

In step 64, the threshold reference value FDT is compared with 0. If 1DT is less than 0, this indicates a significant reduction in compensated velocity and a pulse counter is incremented by adding 1 to the value of the pulse counter in step 66. In step 68, the value of the pulse counter is compared with a predetermined set count, five in the present embodiment, to determine if there have been significant force increases at each of the last five window positions. The set count can, of course, be varied from five to suit the specific application. If the number of pulse counts equals the set count, then it is assumed that an obstacle has been detected and the program moves to step 70 and sets an obstacle detect bit.

Proceeding to step 72, if the obstacle detect bit has not been set, then the program moves to end block 74 and terminates. If, in step 72, it is determined that the obstacle detect bit has been set, then it moves to step 76 and reverses the direction of rotation of motor shaft 32 by signaling relay 31 to reverse the voltage being applied to motor 14. After motor 14 has been reversed, releasing obstacle 52, the program moves to step 78, clearing the pulse counter by setting it equal to zero and then initiates step 80, clearing the obstacle detect bit.

If, in step 68, pulse count is not equal to set count, then the program bypasses step 70 and proceeds to step 72, or alternatively, (not shown) directly to end block 74.

If, in step 64, FDT is not less than 0, then $F_{DM}$ is compared with upper and lower second drag force range values equal to P multiplied by upper and lower second range factors 0.9 and 1.1 respectively. The range factors 0.9 and 1.1 were selected to avoid including unrepresentatively high or low values in the calculated reference values of P. Other values, however, could be employed in place of 0.9 and 1.1, as dictated by the requirements of the system. If $F_{DM}$ falls into the range between the upper and lower second drag force range values, then the program moves on to step 84 where $F_{DM}$ is included in P as described above by multiplying P by 7, adding $F_{DM}$ and dividing the total by 8 to provide a new P. Following step 84, and if $F_{DM}$ is outside of the second drag force range values, the pulse counter is cleared in step 86, and the obstacle detect bit is cleared in step 88. Following step 88, the program proceeds alternatively to either step 72, or (not shown) directly to end block 74.

By thus monitoring the drag force of the window, an inexpensive, yet highly reliable power window system is provided which consistently reverses window direction in response to window impingement against an impediment.

While one embodiment of the invention has been described in detail, it will be apparent to those skilled in the art that the disclosed embodiment may be modified. For example, this same control system could be used with a sun roof or a sliding door instead of a window. Also, the magnet ring could alternatively be fixed to a secondary shaft rotated by the output shaft. Therefore, the foregoing description is to be considered exemplary rather than limiting, and the true scope of the invention is that defined in the following claims.

What is claimed:

1. A power closure system for a motor vehicle comprising:

a closure;

a closure frame defining a seated position of the closure;

a control switch;

an electrical power source including a battery;

an electric motor with an output shaft drivingly connected to the closure and selectively electrically connected to the power source;

a first displacement sensor operably generating a signal indicative of one of closure movement and output shaft rotation;

a second displacement sensor operably generating a signal indicative of one of closure movement and output shaft rotation;

means for sensing a temperature;

means for sensing a current being drawn by the electric motor; and a microprocessor electrically connected to the control switch, the electric motor, the first and second displacement sensors, the means for sensing a temperature and the means for sensing a current, and including means for electrically connecting the motor with the power source responsive to a condition of the control switch;

means for converting signals from the displacement sensors into a predetermined number of closure positions;

means for converting temperature sensed to an electrical signal indicative of the temperature at one of the closure positions;

means for converting current sensed to an electrical signal of motor current at the one of the closure positions;

means for calculating a drag force of the closure as the closure approaches the one of the closure positions;

means for calculating a temperature correction factor using the electrical signal indicative of the temperature and a predetermined reference temperature;

means for calculating a compensated drag force for the one of the closure positions using the calculated drag force and the temperature correction factor; and means for comparing the compensated drag force with a reference drag force for the one of the closure positions and electing to reverse the motor when the compensated drag force is greater than the reference drag force.

2. A power closure system for a motor vehicle as claimed in claim 1 wherein the means for comparing the compensated drag force with a reference drag force and electing to reverse the motor when the compensated drag force is greater than the reference drag force elects to reverse the motor when the compensated drag force is greater than the reference drag force by a predetermined amount.

3. A power closure system for a motor vehicle as claimed in claim 2 further comprising:

means for revising the reference drag force by including the compensated drag force therein when there is not an election to reverse the motor.

4. A power closure system for a motor vehicle as claimed in claim 2 further comprising:

means for calculating upper and lower second drag force range values by multiplying the reference drag force by predetermined upper and lower second range factors and revising the reference drag force by including the compensated drag force therein when the compensated drag force is between the upper and lower second drag force range values when there is not an election to reverse the motor.

5. A power closure system for a motor vehicle as claimed in claim 1, wherein the means for comparing the compensated drag force with a reference drag force and electing to reverse the motor when the compensated drag force is greater than the reference drag force includes:

means for comparing the compensated drag force with a reference drag force and electing to increment a pulse count when the compensated drag force is less than the reference drag force and to clear the pulse count when the compensated drag force is greater than the reference drag force; and means for comparing the incremented pulse count to a predetermined set count and electing to reverse the motor when the incremented pulse count equals the set count.

6. A power closure system for a motor vehicle as claimed in claim 3, wherein the means for comparing the compensated drag force with a reference drag force and electing to reverse the motor when the compensated drag force is greater than the reference drag force includes:

means for comparing the compensated drag force with the reference drag force and electing to increment a pulse count when the compensated drag force is greater than the reference drag force and to clear the pulse count when the compensated drag force is less than the reference drag force; and means for comparing the incremented pulse count to a predetermined set count and electing to reverse the motor when the incremented pulse count equals the set count.

7. A power closure system for a motor vehicle as claimed in claim 3, wherein the means for comparing the compensated drag force with a reference drag force and electing to reverse the motor when the compensated drag force is greater than the reference drag force includes:

means for comparing the compensated drag force with the reference drag force and electing to increment a pulse count when the compensated drag force is greater than the reference drag force, and for clearing the pulse count and calculating upper and lower second drag force range values by multiplying the reference drag force by predetermined upper and lower second range factors when the reference drag force is less than the predetermined threshold reference drag force;

means for comparing the compensated drag force with the upper and lower second drag force range values and revising the reference drag force when the compensated drag force is between the upper and lower second drag force range values; and means for comparing the incremented pulse count to a predetermined set count and electing to reverse the motor when the incremented pulse count equals the set count.

8. A power closure system for a motor vehicle as claimed in claim 1, wherein:

means for calculating the temperature correction factor as equal to the quantity $(1+K_T(T-T_o))$ with $K_T$ equal to a predetermined temperature correction constant and $T_o$ equal to reference temperature and T equal to a temperature sensed at the closure position, and the calculated drag force being divided by the temperature correction factor in calculating the compensated drag force.

9. A method for controlling closure movement in a motor vehicle employing an electric drive motor controlled by a microprocessor including:

mounting a first displacement sensor in a first position relative to a shaft of the electric drive motor;

mounting a second displacement sensor in a second position relative to the shaft of the electric drive motor;

using the first displacement sensor and the second displacement sensor to provide an indication of closure direction and position;

using the microprocessor to calculate a drag force of one of the closure and the motor at a predetermined closure position;

sensing a temperature and converting the temperature sensed to an electrical signal indicative of the temperature at the predetermined closure position;

using the microprocessor to calculate a temperature correction factor by comparing the electrical signal indicative of temperature and a stored reference temperature;

sensing a current and converting the current sensed to an electrical signal of current drawn by the motor at the predetermined closure position;

using the microprocessor to calculate a compensated drag force for the predetermined closure position by dividing the calculated drag force by a temperature correction factor; and comparing the compensated drag force with a reference drag force for the predetermined closure position and electing to reverse the motor when the compensated drag force is greater than the reference drag force.

* * * * *

UNITED STATES PATENT AND TRADEMARK OFFICE
CERTIFICATE OF CORRECTION

PATENT NO. : 5,585,702
DATED : December 17, 1996
INVENTOR(S) : Jackson et al

It is certified that error appears in the above-indentified patent and that said Letters Patent is hereby corrected as shown below:

Title page, Item [54], and col. 1, line 1,
In the title of the invention, delete "Osbtacle" and substitute --OBSTACLE--.

Signed and Sealed this

Twenty-fifth Day of February, 1997

Attest:

BRUCE LEHMAN

*Attesting Officer*  *Commissioner of Patents and Trademarks*